J. J. C. FRAZER.
VEHICLE HUB AND BOX.
No. 192,250.                    Patented June 19, 1877.
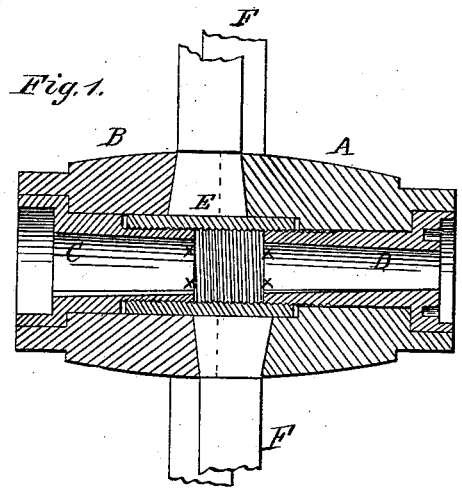
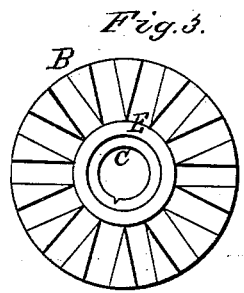 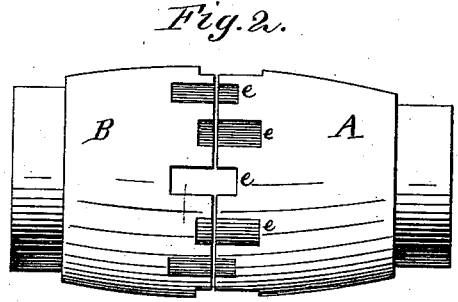 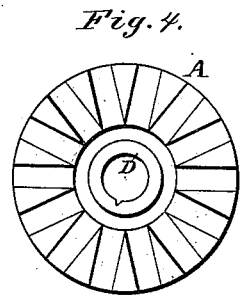
WITNESSES                          INVENTOR
Henry N. Miller              James J. C. Frazer.
John Schroeder
                                          ATTORNEYS

UNITED STATES PATENT OFFICE.

JAMES J. C. FRAZER, OF PHILADELPHIA, PENNSYLVANIA.

IMPROVEMENT IN VEHICLE HUBS AND BOXES.

Specification forming part of Letters Patent No. 192,250, dated June 19, 1877; application filed May 17, 1877.

*To all whom it may concern:*

Be it known that I, JAMES J. C. FRAZER, of Philadelphia, in the county of Philadelphia and in the State of Pennsylvania, have invented certain new and useful Improvements in Hubs and Boxes; and do hereby declare that the following is a full, clear, and exact description thereof, reference being had to the accompanying drawings, and to the letters of reference marked thereon, making a part of this specification.

The nature of my invention consists in the construction of a vehicle hub and box in two parts, and connecting the same together, substantially as hereinafter described.

To enable those skilled in the art to make and use my invention, I will proceed to describe its construction and operation.

In the accompanying drawings, making a part of this specification, Figure 1 represents a longitudinal section; Fig. 2, a plan view of hub with spokes removed, and Figs. 3 and 4 plans of the two parts of the hub separated.

In the figures, A and B represent the two portions of the hub. This hub is made by sawing it in two crosswise at its center, and then cutting the mortises to receive the tenons on the spokes in the usual manner. When the two parts are brought together upon the spokes, the spokes will zigzag or be straight, just as the mortises are cut.

The box is made in two parts, C representing one part and D the other. The inner ends of each section of the box are provided with screw-threads. E represents a sleeve, which is provided with a female screw, into which the inner ends of the box pass and are secured. Each portion of the box is provided with a shoulder, which is intended to bear against a corresponding shoulder in the sections of the hub. It is a very simple matter to put this hub together after the several parts have been properly formed.

The spokes may be inserted in one of the hub-sections, and then the other section is placed upon it.

The sleeve E occupies a central position, so that the ends of the spokes rest upon it. When the two pieces of the box C and D are passed into the hub, and their ends caught and screwed into the sleeve, the two sections are brought together and firmly bound upon the spokes. It will be seen that the two ends of the box do not meet inside of the sleeve, consequently an oil chamber, $x\,x$, or reservoir, is formed, which will retain oil for a long time.

This hub may be easily taken to pieces in case a spoke becomes loose or broken, and can as readily be put together again after the spoke has been repaired.

Having thus fully described my invention, what I claim as new, and desire to secure by Letters Patent, is—

The within-described hub, consisting of the mortised sectional wooden hub A B, the interior sectional box C D, and the screw-sleeve E connecting the sections C D and forming the oil-chamber $x$, all constructed substantially as and for the purposes herein set forth.

In testimony that I claim the foregoing I have hereunto set my hand this 5th day of May, 1877.

JAMES J. C. FRAZER.

Witnesses:
 WM. B. AHERN,
 WILLIAM S. TOLAND.